United States Patent
Kim

(10) Patent No.: US 6,737,874 B2
(45) Date of Patent: May 18, 2004

(54) FAULT AND NOISE TOLERANT SYSTEM AND METHOD

(75) Inventor: Pyung-soo Kim, Suwon-si (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/206,966

(22) Filed: Jul. 30, 2002

(65) Prior Publication Data

US 2003/0034786 A1 Feb. 20, 2003

(30) Foreign Application Priority Data

Aug. 8, 2001 (KR) ........................................ 2001-47726

(51) Int. Cl.⁷ .............................................. G01R 29/26
(52) U.S. Cl. ...................................... 324/613; 324/614
(58) Field of Search ................................ 324/613, 614, 324/76.29, 76.31, 76.44, 76.68, 615, 616

(56) References Cited

FOREIGN PATENT DOCUMENTS

| JP | 59136809 A | * | 8/1984 | ........... G05B/23/02 |
| JP | 04123141 A | * | 4/1992 | ........... G06F/11/18 |
| JP | 7-219797 | | 8/1995 | |
| JP | 7-334235 | | 12/1995 | |

* cited by examiner

Primary Examiner—Stephen R. Funk
Assistant Examiner—Minh Chau
(74) Attorney, Agent, or Firm—Sughrue Mion, PLLC

(57) ABSTRACT

A fault and noise tolerant system and method for obtaining an original signal which is not influenced by a fault or noise occurring in an electronic equipment. The fault and noise tolerant system includes a first estimation filter for estimating an original signal from a signal output from the electronic equipment, considering noise of the electronic equipment; a second estimation filter for estimating the original signal and a fault signal from the signal output from the electronic equipment, considering a fault and the noise; a fault detection unit for detecting the presence or absence of a fault in the electronic equipment based on the estimated fault signal received from the second estimation filter; and a selection unit for selecting one of the estimated original signals from the first and second estimation filters, respectively, according to the result of detection of the fault detection unit. Accordingly, it is possible to obtain the signal of the electronic equipment that is not influenced by the fault and noise of the electronic equipment.

12 Claims, 2 Drawing Sheets

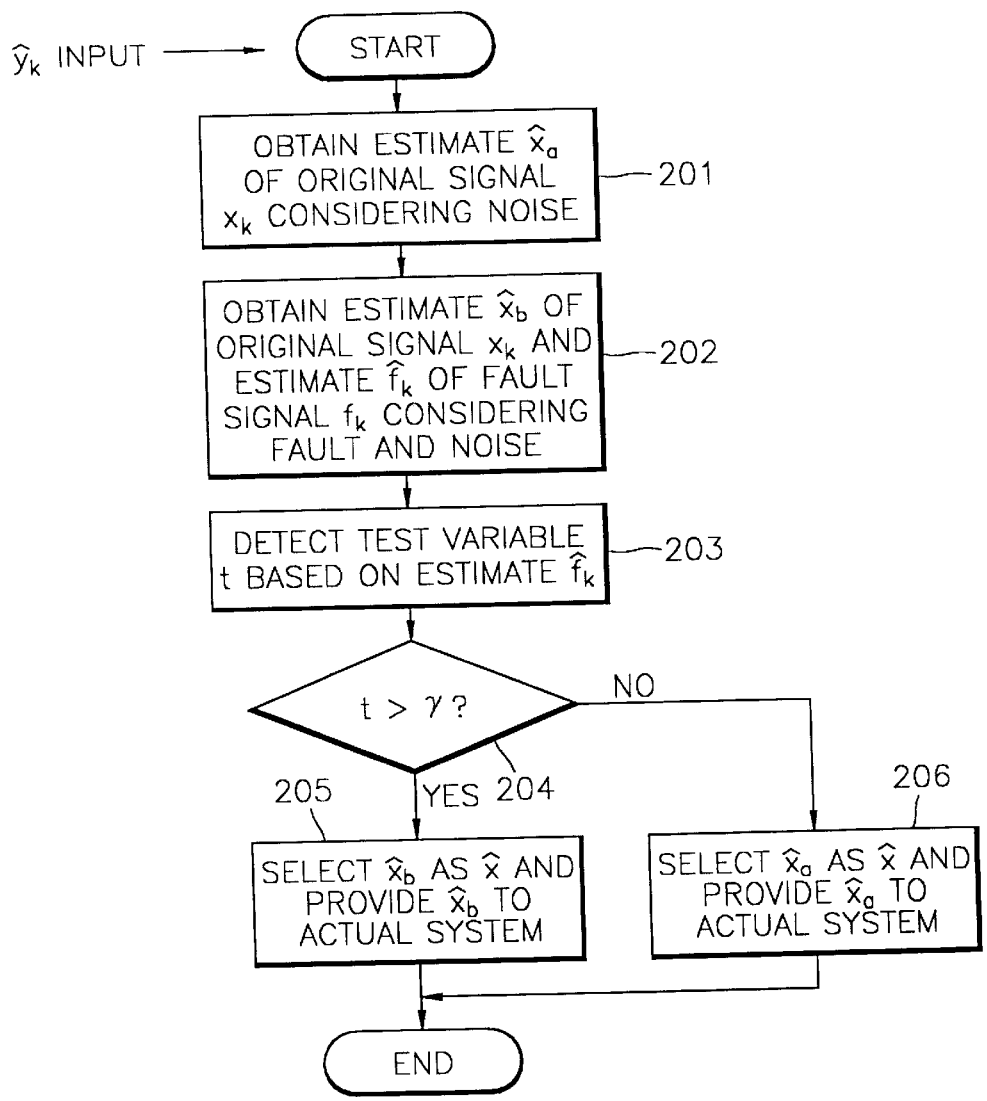

FAULT AND NOISE TOLERANT SYSTEM AND METHOD

BACKGROUND OF THE INVENTION

1. Field of the Invention

The present invention relates to a fault and noise tolerant system and method for electronic equipment, and more particularly, to a system and method for tolerating unknown faults and noise in electronic equipment so that a signal generated by the electronic equipment is not influenced by the unknown faults and noise. The present application is based on Korean Patent Application No. 2001-47726, filed Aug. 8, 2001, which is incorporated herein by reference.

2. Description of the Related Art

Electronic equipment such as global positioning systems, inertial navigation systems, motor control systems, engine control systems, communication systems, and speech enhancement and recognition systems generate various types of signals. When unknown faults (such as faults, biases, or maneuvers) or noise occurs in electronic equipment, these signals are mixed with noise or fault signals generated due to the unknown faults.

When a signal generated in an electronic equipment is mixed with a fault signal or noise, a result obtained based on the signal has an error. In order to prevent a result from having an error due to an unknown fault or noise, there has been provided an apparatus which compares a signal generated from a system in which the characteristics of a given electronic equipment are mathematically modeled with a signal actually generated from the given electronic equipment to detect presence or absence of an unknown fault and/or noise.

However, the conventional apparatus only determines whether an unknown fault or noise occurs in the electronic equipment and reports the result of determination to allow an operator of the electronic equipment to take proper measures or to stop the operation of the electronic equipment. The conventional apparatus, however, does not obtain an original signal which does not include a fault signal or noise.

SUMMARY OF THE INVENTION

To solve the above-described problems, it is an object of the present invention to provide a fault and noise tolerant system and method for obtaining an original signal which is not influenced by a fault or noise occurring in an electronic equipment.

To achieve the above object of the present invention, there is provided a fault and noise tolerant system for electronic equipment. The fault and noise tolerant system includes a first estimation filter for estimating an original signal from a signal output from the electronic equipment, considering noise of the electronic equipment; a second estimation filter for estimating the original signal and a fault signal from the signal output from the electronic equipment, considering a fault and the noise; a fault detection unit for detecting presence or absence of a fault in the electronic equipment based on the estimated fault signal received from the second estimation filter; and a selection unit for selecting one of the estimated original signals from the first and second estimation filters, respectively, according to the result of detection of the fault detection unit.

Preferably, the first estimation filter is configured based on a state space model considering the noise without considering the fault with respect to the signal output from the electronic equipment, and the second estimation filter is configured based on a state space model considering both the noise and the fault with respect to the signal output from the electronic equipment.

Preferably, the fault detection unit includes a scalar value detector for detecting a scalar value of the estimated fault signal received from the second estimation filter, and a comparator for comparing the scalar value with a predetermined threshold value and outputting the result of comparison as the result of detection of the presence or absence of a fault.

Preferably, the comparator outputs the result of detection so that the selection unit selects the estimated original signal from the first estimation filter when the scalar value does not exceed the threshold value and selects the estimated original signal from the second estimation filter when the scalar value exceeds the threshold value.

To achieve the above object of the present invention, there is also provided a fault and noise tolerant method for electronic equipment, including the steps of estimating an original signal from a signal applied from the electronic equipment, considering noise of the electronic equipment; estimating the original signal and a fault signal from the signal applied from the electronic equipment, considering a fault signal and the noise; detecting presence or absence of a fault in the electronic equipment based on the estimated fault signal; and selecting the result of estimation considering the noise of the electronic equipment as a signal generated from the electronic equipment when there is no fault in the electronic equipment and selecting the result of estimation considering both noise and fault of the electronic equipment as the signal generated from the electronic equipment when there is any fault in the electronic equipment.

Preferably, the step of detecting presence or absence of a fault includes the steps of detecting a scalar value of the estimated fault signal; comparing the detected scalar value with a predetermined threshold value; if the detected scalar value does not exceed the predetermined threshold value, outputting a signal for selecting the result of estimation considering the noise of the electronic equipment as the result of detection of presence or absence of a fault; and if the detected scalar value exceeds the predetermined threshold value, outputting a signal for selecting the result of estimation considering both noise and fault of the electronic equipment as the result of detection of presence or absence of a fault.

Preferably, the fault and noise tolerant method further includes the step of providing the result of selection to the electronic equipment.

BRIEF DESCRIPTION OF THE DRAWINGS

The above object and advantages of the present invention will become more apparent by describing in detail preferred embodiments thereof with reference to the attached drawings in which:

FIG. 2 is a flowchart of a fault and noise tolerant method according to an embodiment of the present invention.

DETAILED DESCRIPTION OF THE INVENTION

Figure 1:
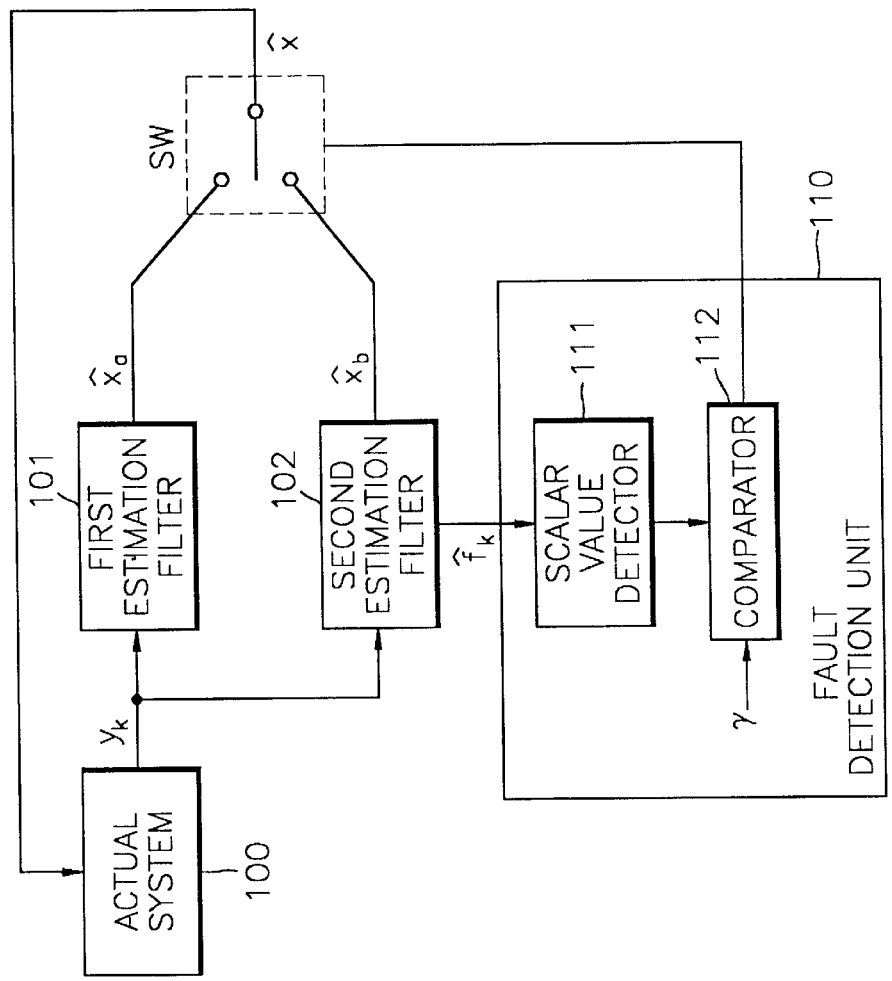
FIG. 1 is a block diagram of a fault and noise tolerant system according to an embodiment of the present invention.

Hereinafter, a preferred embodiment of the present invention will be described in detail with reference to the attached drawings.

FIG. 1 is a block diagram of a fault and noise tolerant system according to an embodiment of the present invention. Referring to FIG. 1, the fault and noise tolerant system includes an actual system 100 which generates an original signal, a first estimation filter 101 which estimates the original signal considering only a noise signal without considering a fault signal, a second estimation filter 102 which estimates the original signal and the fault signal considering the fault signal and the noise signal, a fault detection unit 110 which detects presence or absence of a fault in the actual system 100 based on the estimated fault signal from the second estimation filter 102, and a switch SW which selects one of the estimated original signals from the first and second estimation filters 101 and 102, respectively, according to the result of detection of the fault detection unit 110 and transmits the selected one to the actual system 100.

The actual system 100 is electronic equipment such as a global positioning system, an inertial navigation system, a motor control system, an engine control system, a communication system, or a speech enhancement and recognition system.

A signal $y_k$ output from the actual system 100 is generated from an element such as a sensor (not shown) provided in the actual system 100. The signal $y_k$ must be the same as an original signal $x_k$. However, when an unknown fault signal $f_k$ and noise having a statistical property occur in the actual system 100, the signal $y_k$ is a signal in which the original signal $x_k$ is mixed with the unknown fault signal $f_k$ and the noise having the statistical property. When the unknown fault signal $f_k$ is not generated and only the noise having the statistical property is generated, the signal $y_k$ is a signal in which the original signal $x_k$ is mixed with the noise having the statistical property. The signal $y_k$ output from the actual system 100 is transmitted to both the first and second estimation filters 101 and 102.

The first estimation filter 101 is realized using a mathematical model considering only noise without considering an unknown fault signal with respect to the signal $y_k$ output from the actual system 100. The mathematical model is a state space model with respect to the signal $y_k$. A state space model of the first estimation filter 101 is expressed by Formula (1).

$$y_k = Cx_k + v_k \quad (1)$$

Here, $x_k$ is an original signal, that is, a signal including no unknown fault and no noise, and is a signal which the first estimation filter 101 is to estimate from the signal $y_k$ output from the actual system 100. The signal $x_k$ is referred to as a state variable in a mathematical sense. As mentioned above, the signal $y_k$ is generated from an element such as a sensor provided in the actual system 100, and $v_k$ is a noise signal.

The signal $y_k$ is a known signal since it is provided from the actual system 100. The noise signal $v_k$ is an unknown signal, but since it has a statistical property, its covariance can be assumed as a matrix R. Accordingly, the matrix R can be set in the first estimation filter 101 in advance. In Formula (1), C is a matrix which is given depending on the operating conditions of the actual system 100 and can be set in the first estimation filter 101 in advance.

Formula (2) expresses the operating characteristics of the original signal $x_k$ included in the signal $y_k$ input to the first estimation filter 101.

$$x_{k+1} = Ax_k + Gw_k \quad (2)$$

Here, $x_k$ is a signal which the first estimation filter 101 is to estimate from a signal output from the actual system 100 at a current time k, and $x_{k+1}$ is a signal which the first estimation filter 101 is to estimate from a signal output from the actual system 100 at a next time k+1. Like C, A and G are matrixes given depending on the operating conditions of the actual system 100 and can be set in the first estimation filter 101 in advance. Like the signal $v_k$, $w_k$ is an undesirable noise signal, and its covariance can be assumed as a matrix $\overline{Q}$. Accordingly, the matrix $\overline{Q}$ can be set in the first estimation filter 101.

The first estimation filter 101 configured based on the mathematical model considering only a noise signal without considering a fault signal with respect to the actual system 100 obtains an estimate $\hat{x}_a$ of the original signal $x_k$ according to Formula (3).

$$\hat{x}_a = H_a Y \quad (3)$$

Here, Y indicates N+1 samples of the signal $y_k$ output from the actual system 100 from the current time k to a past time k−N and can be expressed by Formula (4) in a vector form.

$$Y \equiv \begin{bmatrix} y_{k-N} \\ y_{k-N+1} \\ \vdots \\ y_{k-1} \\ y_k \end{bmatrix} \quad (4)$$

An estimation filter gain matrix $H_a$ is obtained using the given matrixes A, G, C, $\overline{Q}$, and R. A formula for obtaining the estimation filter gain matrix $H_a$ using the given matrixes A, G, C, $\overline{Q}$, and R is introduced by this inventor ["A Receding Horizon Kalman FIR Filter for Discrete Time-Invariant Systems", IEEE Transactions on Automatic Control, Vol. 44, No. 9, pp. 1787–1791, 1999], and thus a description thereof will be omitted. Accordingly, the estimation filter gain matrix $H_a$ can be set in the first estimation filter 101 in advance. After the Y is obtained, the first estimation filter 101 multiplies $H_a$ by Y, as shown in Formula (3), and outputs the result of multiplication as the estimate $\hat{x}_a$. The estimate $\hat{x}_a$ output from the first estimation filter 101 is an original signal that is estimated from the signal $y_k$ considering only a noise signal. Here, the noise signals $w_k$ and $v_k$ are eliminated by the estimation filter gain matrix $H_a$ including their covariances Q and R. The estimate $\hat{x}_a$ is transmitted to the switch SW.

A mathematical model considering a fault signal with respect to the actual system 100 is expressed by Formula (5).

$$x_{k+1} = Ax_k + Df_k + Gw_k$$

$$y_k = Cx_k + f_k + v_k \quad (5)$$

In Formula (5), the unknown fault signal $f_k$ is added to Formulas (1) and (2). Formula (5) can be newly modeled as Formula (6) by considering the unknown fault signal $f_k$ as a state variable.

$$\overline{x_{k+1}} = \overline{A}\overline{x_k} + \overline{G}\overline{w_k}$$

$$y_k = \overline{C}\overline{x_k} + v_k \quad (6)$$

In Formula (6), variables and matrixes are $$\overline{x_k} = \begin{bmatrix} x_k \\ f_k \end{bmatrix}, \overline{A} = \begin{bmatrix} A & D \\ 0 & I \end{bmatrix},$$

$$\overline{G} = \begin{bmatrix} G & 0 \\ 0 & I \end{bmatrix}, \text{ and } \overline{C} = \begin{bmatrix} C & 0 \\ 0 & I \end{bmatrix},$$

and the covariances of $\overline{w}_k$ and $v_k$ are $\overline{Q}$ and R. Formula (6) defines the mathematical model based on the new state variable $\overline{x}_k$ obtained by adding the fault signal $f_k$ to the original signal $x_k$.

Accordingly, based on the mathematical model which considers a fault signal and noise with respect to the signal $y_k$ output from the actual system 100 and is expressed by Formula (6), the second estimation filter 102 is configured to simultaneously obtain and output an estimate $\hat{x}_b$ of the original signal $x_k$ and an estimate $\hat{f}_k$ of the fault signal $f_k$ according to Formula (7).

$$\hat{\overline{x}}_k = \begin{bmatrix} \hat{x}_b \\ \hat{f}_k \end{bmatrix} = H_b Y = \begin{bmatrix} H_{bx} \\ H_{bf} \end{bmatrix} Y \quad (7)$$

The estimate $\hat{x}_b$ corresponds to an original signal which is estimated considering both a fault signal and a noise signal with respect to the signal $y_k$, and the estimate $\hat{f}_k$ corresponds to a fault signal which is estimated with respect to a fault signal included in the signal $y_k$. In Formula (7), as described in the explanation of Formula (3), Y indicates N+1 samples of the signal $y_k$ output from the actual system 100 from the current time k to a past time k−N. An estimation filter gain matrix $H_b$ can be obtained using matrixes $\overline{A}$, $\overline{G}$, $\overline{C}$, $\overline{Q}$, and R given in the same manner as in the first estimation filter 101 and is set in the second estimation filter 102 in advance. In addition, the estimation filter gain matrix $H_b$ can be separated into a gain matrix $H_{bx}$ for the original signal $x_k$ and a gain matrix $H_{bf}$ for the fault signal $f_k$, as shown in Formula (7). The second estimation filter 102 transmits the estimate $\hat{x}_b$ to the switch SW and transmits the estimate $\hat{f}_k$ to the fault detection unit 110.

Each of the first and second estimation filters 101 and 102 can be realized as a finite impulse response (FIR) filter.

The fault detection unit 110 detects the presence or absence of a fault using the statistical property of the estimate $\hat{f}_k$ received from the second estimation filter 102. For this, the fault detection unit 110 includes a scalar value detector 111 and a comparator 112.

The scalar value detector 111 detects a scalar value using a test variable t in the form of correlation which is defined based on the statistical property of the estimate $\hat{f}_k$. The test variable t is defined by Formula (8). As is seen from Formula (8), the test variable t is obtained using the sum of estimates $\hat{f}_k$ obtained for a predetermined period of time.

$$t = \hat{f}_k^T \Sigma^{-1} \hat{f}_k \quad (8)$$

Here, $\hat{f}_k^T$ is a transpose of $\hat{f}_k$, and $\Sigma$ is a covariance of the estimate $\hat{f}_k$ of a fault signal when there is no fault, as expressed by Formula (9), and is a weight allowing the presence of a fault to be definitely discriminated from the absence of a fault. $\Sigma$ can be obtained in advance using the matrixes $\overline{A}$, $\overline{G}$, $\overline{C}$, $\overline{Q}$, and R and the gain matrix $H_{bf}$.

$$\Sigma = E[\hat{f}_k \, \hat{f}_k^T | \{\hat{f}_k = 0\}] \quad (9)$$
$$= H_{bf} \Xi H_{bf}^T$$

Matrixes used in Formula (9) are expressed by Formula (10).

$$\Xi = \Gamma \begin{bmatrix} Q & 0 & \cdots & 0 \\ 0 & Q & \cdots & 0 \\ \vdots & \vdots & \vdots & \vdots \\ 0 & 0 & \cdots & Q \end{bmatrix} \Gamma^T + \begin{bmatrix} R & 0 & \cdots & 0 \\ 0 & R & \cdots & 0 \\ \vdots & \vdots & \vdots & \vdots \\ 0 & 0 & \cdots & R \end{bmatrix} \quad (10)$$

$$\Gamma \equiv \begin{bmatrix} CA^{-1}G & CA^{-2}G & \cdots & CA^{-N}G & 0 \\ 0 & CA^{-1}G & \cdots & CA^{-N+1}G & 0 \\ \vdots & \vdots & \vdots & \vdots & \vdots \\ 0 & 0 & \cdots & CA^{-1}G & 0 \\ 0 & 0 & \cdots & 0 & 0 \end{bmatrix}$$

The test variable t, which is a scalar value of the estimate $\hat{f}_k$, is transmitted to the comparator 112. The comparator 112 compares the test variable t with a predetermined threshold value γ. If the test variable t exceeds the threshold value γ, the comparator 112 outputs a detection result indicating the presence of a fault. In contrast, if the test variable t does not exceed the threshold value γ, the comparator 112 outputs a detection result indicating the absence of a fault.

When the detection result indicating the presence of a fault is output from the fault detection unit 110, the switch SW selects the estimate $\hat{x}_b$ received from the second estimation filter 102 as an output $\hat{x}$. In contrast, when the detection result indicating the absence of a fault is output from the fault detection unit 110, the switch SW selects the estimate $\hat{x}_a$ received from the first estimation filter 101 as an output $\hat{x}$. The output $\hat{x}$ is provided to the actual system 110 so that it can be used when the actual system 110 performs other functions. The output $\hat{x}$ can be provided to a different system than the actual system 110.

In the above embodiment of the present invention, one of the result of estimating an original signal from a generated signal considering only noise and the result of estimating an original signal from a generated signal considering both a fault and noise is selected according to the presence or absence of a fault and output.

The present invention can be embodied to provide only the result of estimating an original signal from a generated signal considering both a fault and noise to the actual system 100. In other words, when the signal $y_k$ is output from the actual system 100, the second estimation filter 102 configured based on Formula (5) eliminates the fault signal $f_k$ and the noise signals $\overline{w}_k$ and $v_k$ using the covariance matrixes set in advance and obtains the estimate $\overline{x}_b$. The estimate $\overline{x}_b$ is transmitted to the actual system 100.

FIG. 2 is a flowchart of a fault and noise tolerant method according to an embodiment of the present invention. Once a signal $y_k$ output from the actual system 100 is applied, an estimate $\hat{x}_a$ of an original signal $x_k$ is obtained based on a mathematical model defined by Formulas (1) and (2) considering noise as in the first estimation filter 101 in step 201.

An estimate $\hat{x}_b$ of the original signal $x_k$ and an estimate $\hat{f}_k$ of a fault signal $f_k$ are obtained based on a mathematical model considering a fault signal and noise as in the second estimation filter 102 in step 202.

Next, a test variable t is detected using Formulas (8) and (9) based on the estimate $\hat{f}_k$ of the fault signal $f_k$ in step 203.

The test variable t is a scalar value of the estimate $\hat{f}_k$ of the fault signal $f_k$. The detected test variable t is compared with a threshold value γ in step 204. If the test variable t exceeds the threshold value γ, the estimate $\hat{x}_b$ is selected as an estimate $\hat{x}$ of the original signal $x_k$ and provided to the actual system 100 in step 205, and the operation ends.

In contrast, if the test variable t does not exceed the threshold value γ, the estimate $\hat{x}_a$ is selected as an estimate $\hat{x}$ of the original signal $x_k$ and provided to the actual system 100 in step 206, and the operation ends.

According to a fault and noise tolerant system and method of the present invention, signals generated from electronic equipment such as global positioning systems and inertial navigation systems used in the field of aeronautics or signals generated from electronic equipment such as communication systems and speech enhancement and recognition systems can be optimally prevented from being influenced by faults or noise occurring in the electronic equipment.

The present invention is not restricted to the above-described preferred embodiments, and it will be understood by those skilled in the art that various changes in form and details may be made therein. Therefore, the scope of the invention will be defined not by the above detailed description of the invention but by the following appended claims.

What is claimed is:

1. A fault and noise tolerant system for electronic equipment, comprising:
    a first estimation filter for estimating an original signal from a signal output from the electronic equipment, considering noise of the electronic equipment;
    a second estimation filter for estimating the original signal and a fault signal from the signal output from the electronic equipment, considering a fault and the noise;
    a fault detection unit for detecting presence or absence of a fault in the electronic equipment based on the estimated fault signal received from the second estimation filter; and
    selection means for selecting one of the estimated original signals from the first and second estimation filters, respectively, according to the result of detection of the fault detection unit.

2. The fault and noise tolerant system of claim 1, wherein the first estimation filter is configured based on a first state space model considering the noise without considering the fault with respect to the signal output from the electronic equipment.

3. The fault and noise tolerant system of claim 2, wherein the second estimation filter is configured based on a second state space model considering both the noise and the fault with respect to the signal output from the electronic equipment.

4. The fault and noise tolerant system of claim 1, wherein each of the first and second estimation filters is realized as a finite impulse response filter.

5. The fault and noise tolerant system of claim 1, wherein the fault detection unit comprises:
    a scalar value detector for detecting a scalar value of the estimated fault signal received from the second estimation filter; and
    a comparator for comparing the scalar value with a predetermined threshold value and outputting the result of comparison as the result of detection of the presence or absence of a fault.

6. The fault and noise tolerant system of claim 5, wherein the scalar value detector applies a weight to increase a difference between the presence of a fault and the absence of a fault when detecting the scalar value.

7. The fault and noise tolerant system of claim 5, wherein the scalar value detector defines a test variable t in a form of correlation using a statistical property of the estimated fault signal $\hat{f}_k$ for a predetermined period of time as $t = \hat{f}_k^T \Sigma^{-1} \hat{f}_k$, when detecting the scalar value, where $\hat{f}_k^T$ is a transpose of $\hat{f}_k$, and $\Sigma$ is a covariance of the estimated fault signal $\hat{f}_k$ when there is no fault.

8. The fault and noise tolerant system of claim 5, wherein the comparator outputs the result of detection so that the selection means selects the estimated original signal from the first estimation filter when the scalar value does not exceed the threshold value and selects the estimated original signal from the second estimation filter when the scalar value exceeds the threshold value.

9. The fault and noise tolerant system of claim 1, wherein the fault and noise tolerant system is designed such that the signal selected by the selection means is provided to the electronic equipment.

10. A fault and noise tolerant method for electronic equipment, comprising the steps of:
    estimating an original signal from a signal applied from the electronic equipment, considering noise of the electronic equipment;
    estimating the original signal and a fault signal from the signal applied from the electronic equipment, considering a fault signal and the noise;
    detecting presence or absence of a fault in the electronic equipment based on the estimated fault signal; and
    selecting the result of estimation considering the noise of the electronic equipment as a signal generated from the electronic equipment when there is no fault in the electronic equipment and selecting the result of estimation considering both noise and fault of the electronic equipment as the signal generated from the electronic equipment when there is a fault in the electronic equipment.

11. The fault and noise tolerant method of claim 10, wherein the step of detecting presence or absence of a fault comprises the steps of:
    detecting a scalar value of the estimated fault signal;
    comparing the detected scalar value with a predetermined threshold value;
    if the detected scalar value does not exceed the predetermined threshold value, outputting a signal for selecting the result of estimation considering the noise of the electronic equipment as the result of detection of presence or absence of a fault; and
    if the detected scalar value exceeds the predetermined threshold value, outputting a signal for selecting the result of estimation considering both noise and fault of the electronic equipment as the result of detection of presence or absence of a fault.

12. The fault and noise tolerant method of claim 10, further comprising the step of providing the result of selection to the electronic equipment.

* * * * *